3,300,979
APPARATUS FOR CONTROLLING THE AFTER-
BURNER LOAD OF A JET ENGINE ACCORDING
TO THE JET PIPE APERTURE
Jacques Aubert, Chatenay-Malabry, France, assignor to Societe Nationale d'Etude et de Construction de Moteurs d'Aviation, Paris, France, a company of France
Filed Oct. 21, 1964, Ser. No. 405,537
Claims priority, application France, Oct. 23, 1963, 951,560
4 Claims. (Cl. 60—237)

This invention relates to controllable afterburning aviation turbojets with continuously adjustable jet pipe sections. It is more particularly though not exclusively concerned with turbojets in which the afterburner fuel flow (designated hereinafter by $C'$) is "programmed," i.e. controlled automatically as a function of an independent parameter in obedience to a law established once and for all, and in which the jet pipe section is "regulated," i.e. controlled by a regulator in order that certain of the turbo-jet parameters obey a predetermined law. The pilot may at any time regain control, however, notably over the flow $C'$.

The afterburner load, which is governed by the programmed fuel fuel $C'$, can attain values such that the jet pipe regulator is incapable of maintaining the parameters it controls at suitable values. Indeed certain of these parameters may overstep the safety limits because the jet pipe section that would be required to prevent this is greater than the maximum possible jet pipe section. The pilot must then intervene in order to reduce the flow $C'$.

It is the object of the present invention to provide a load limiter which overcomes this disadvantage by automatically reducing the afterburner load as soon as the jet pipe approaches its maximum aperture.

A load limiter according to the invention accordingly modifies the law in obedience to which the flow $C'$ is programmed as a function of said independent parameter. Such a load limiter can be activated directly by the movable elements defining the jet pipe aperture, or else by one of the parameters controlled by the jet pipe regulator, this parameter being chosen from among those which would not risk damaging the turbojet in the absence of said limiter.

The invention is more particularly though not exclusively applicable to single-spool or twin-spool turbojets.

In such turbojets the combustion chamber exit temperature is usually maintained constant by the principal regulator, which meters the fuel injected into the combustion chamber accordingly.

In the specific case of a single-spool turbojet, this regulator can additionally maintain the turbine rotation speed constant, and the jet pipe section is so controlled that, with this rotation speed constant, the turbine entry temperature remains constant. With this type of principal regulation, the use of a regulating system in which the flow $C'$ is programmed may exhibit the aforementioned drawback in the region of maximum afterburner load; for the jet pipe section is limited mechanically to a maximum value and if, therefore, as a result of the afterburner regulator going out of adjustment the jet pipe section that would be required to maintain a constant combustion temperature were greater than the maximum feasible jet pipe section, overheating would occur upflow of the turbine and the pilot would have to use the throttle lever to reduce the programmed afterburner fuel flow rate $C'$.

It would clearly be possible to limit the afterburner load by detecting turbine overheating, an example being the temperaure rise ahead of the turbine in correlation to the setting of the jet pipe at maximum outlet section; this, however, would mean adopting a wide safety margin, as even momentary overheating could damage the engine.

In the case of a single-spool turbojet, therefore, the limiter according to the present invention automatically reduces the afterburner load when the jet pipe reaches its maximum outlet section, without any intervention on the part of the pilot, allowing the temperature ahead of the turbine to revert to its normal regulated value.

By way of example, such a load limiter may be actuated mechanically or electrically by the jet-pipe itself when the same approaches its maximum outlet section. Alternatively, the jet-pipe geometry may be detected by means of a modulated pressure, using a hydraulic or pneumatic detector. A further possibility would be to detect the jet pipe closing pressure through the agency of the nozzle control ram, said pressure being zero when the nozzle has reached its mechanical abutment stop.

In the case of twin-spool turbojets (of the single or by-pass flow type), the principal regulator is generally designed to maintain the turbine upflow temperature constant by operating on the speed of the high pressure (HP) spool even if the nozzle is against its limit stop at maximum aperture. When this is the case, however, the nozzle regulator will be unable to correctly control the regulated parameter it must govern (an example being the speed of the low pressure (LP) spool of the expansion through the LP turbine) if the afterburner fuel flow $C'$ increases after the nozzle is in mechanical abutment at maximum aperture against its limit stop. When such is the case, the speed of the LP spool will drop, resulting in the load limiter reducing the flow $C'$ until the nozzle regulator can operate anew, i.e. until the speed of the LP spool (for instance) has reverted to its regulated value. It will be noted that the need to maintain the speed of the LP spool is impertaive under supersonic operating conditions, in which the air mass flow is primarily dependent upon the speed of the LP spool, and the efficiency of the intake duct in turn depends upon the value of this air mass flow.

In this specific case, detection may be effected either directly by detecting the nozzle geometry (as stated precedingly), or else by detecting the point at which the nozzle regulator reaches stagnation, i.e. is no longer able to control the parameters it is designed to govern; for in this case a drop in the speed of the LP spool will not damage the engine, so that the value of the parameter (the speed of the LP spool or the expansion therethrough) activating the load limiter may be detected as closely as is desired to the limit value ensuring satisfactory turbojet operation.

The description which follows with reference to the accompanying non-limitative exemplary drawings will give a clear understanding of the various features of the present invention and of the art of carrying them into practice, any specific dispositions as emerge either from the description or the drawings naturally falling within the scope of the invention as defined in the appending claims.

In the drawings,

FIGURE 1 schematically illustrates an afterburner load limiter according to the invention as applied to a single-spool turbojet viewed in side elevation and in partial section;

Figure 1:
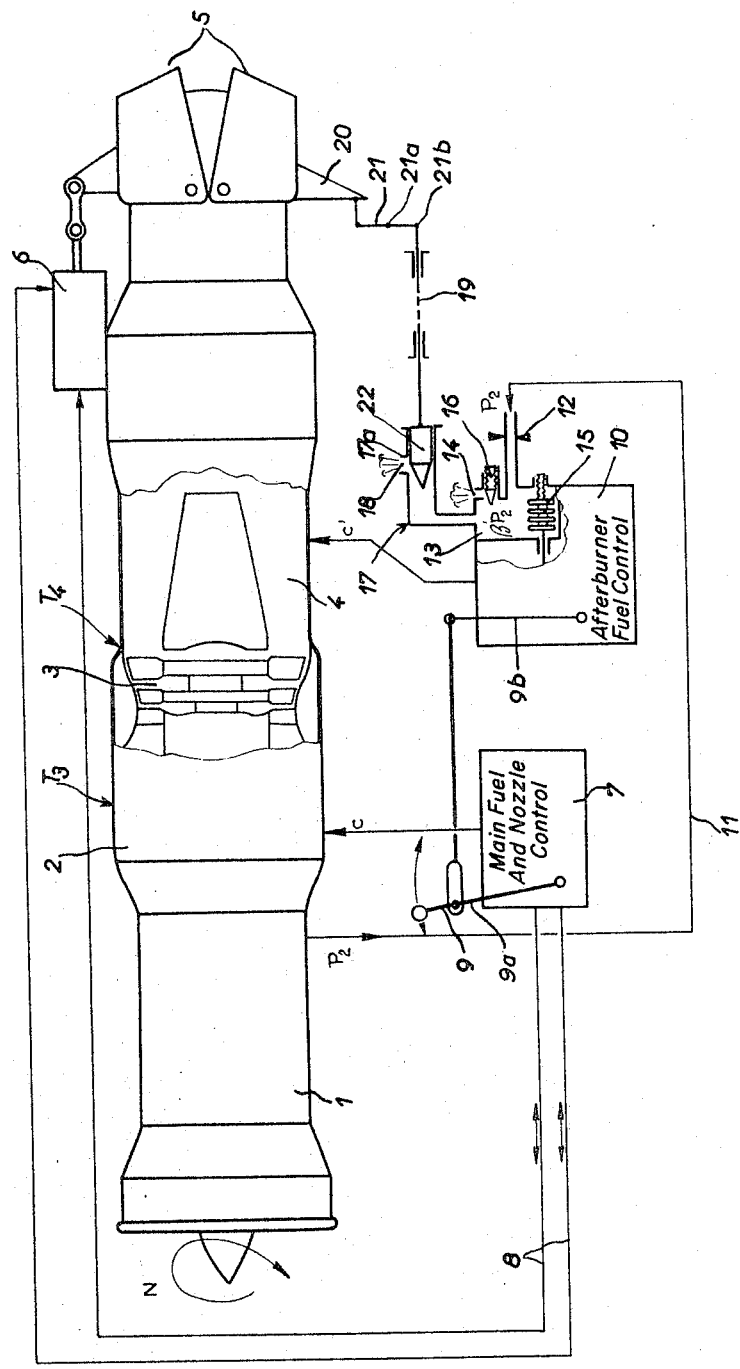

Referring first to FIGURE 1, the single-spool turbojet shown thereon comprises, in the manner well known per se, a compressor 1, a combustion chamber 2, a turbine 3 driving the compressor 1, an afterburner chamber 4 and a variable-section exit nozzle schematically represented by flaps 5 which open and close in response to nozzle rams designated by the reference numeral 6.

The main regulator 7 meters, in any known manner, the fuel flow C to the main injectors of the combustion chamber 2, with interaction upon the nozzle rams 6 through the control lines 8 thereof, whereby to regulate the outlet section of nozzle 5 and thereby maintain constant the temperature $T_3$ on entry into turbine 3 as a function of the speed therof. The same lever 9 at the pilot's disposal controls, at 9a, the main regulator 7 and, at 9b, the afterburner regulator 10. Through a line 11, the regulator 10 receives compressed air at a pressure $P_2$ bled from the exit of compressor 1. This compressed air passes through a restriction 12 and expands in a constant ratio to a pressure $\beta'P_2$ in a chamber 13 embodying fixed-leakage means 14, in which chamber this air operates on the exterior of capsules 15 controlling, in the manner well known per se, a metering device (not shown) which determines the fuel flow $C'$ to the afterburner injectors. This flow $C'$ is thus "programmed" as a function of the pressure $P_2$. The level of $\beta'$ is adjustable by means of an adjustment screw 16 for constricting the leakage section 14.

The afterburner load limiter comprises a valve 17 the upflow side of which communicates with chamber 13 and the calibrated downflow side 17a of which is vented to the open atmosphere, said valve being normally closed and means being provided for opening it when the nozzle 5 is fully open. When the maximum nozzle outlet section is reached, the effect of opening the valve 17 will be to create a further leakage flow 18 in the chamber 13 containing the correction capsules 15, thereby causing the reduced pressure $\beta'P_2$ prevailing therein to be lowered; this in turn activates the capsules 15, resulting in a reduction in the flow $C'$ determined by the metering device controlled by said capsules.

In the form of embodiment shown in FIGURE 1, the limit position (maximum aperture) of nozzle 5 is detected by a mechanical device 19, examples thereof being a cable, link means, or a flexible control means such as that known by the trade name "Teleflex," and this device actuates the plug means for opening the discharge valve 17. One of the flaps of nozzle 5 is equipped with a heel portion 20 which, as the nozzle reaches maximum aperture, causes a lever 21 fulcrumed at 21a to pivot in an anti-clockwise direction. Said lever has its other end 21b pivotally connected to the mechanical device 19 which is in turn connected to a needle 22 forming the plug means of valve 17, whereby the latter is constrained to slide and open said valve.

Figure 2:
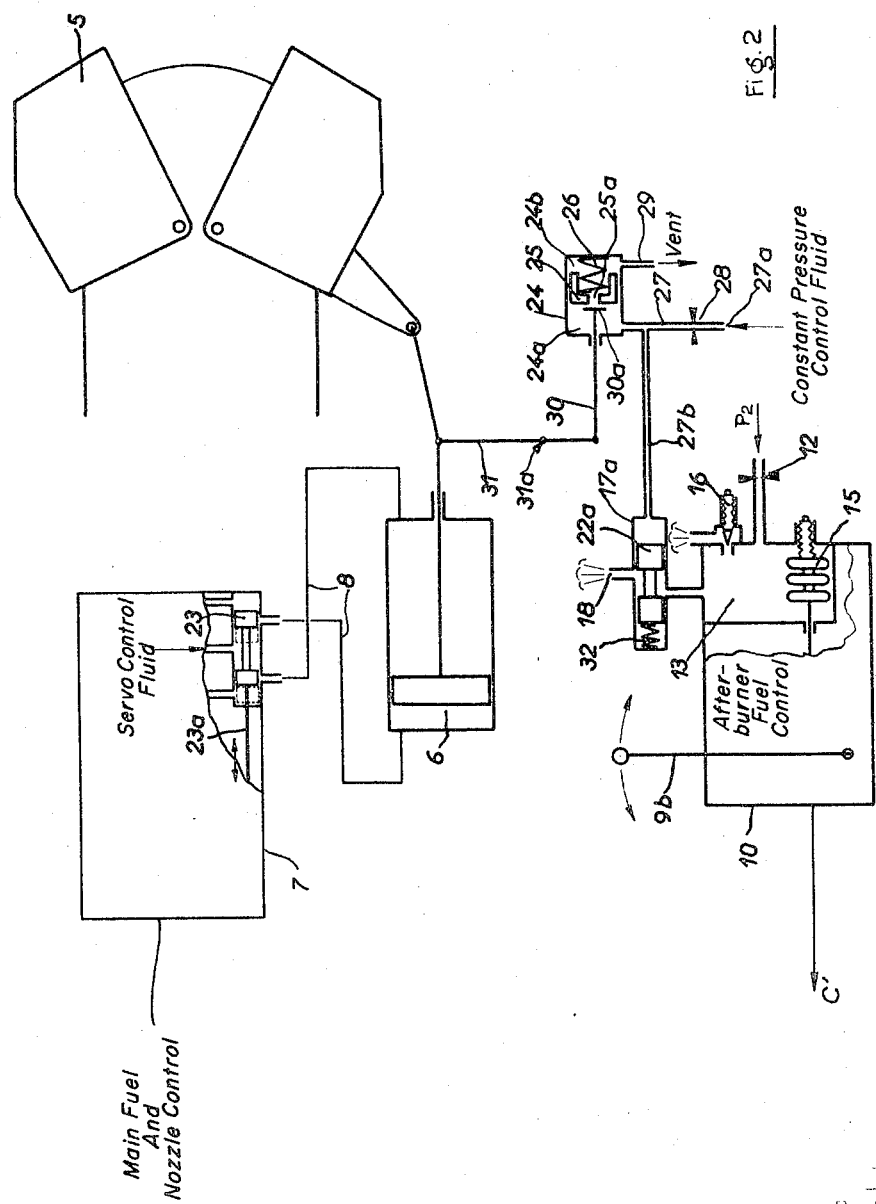
FIGURES 2 and 3 are fragmental diagrammatic views of alternative constructional forms of the subject limiter of the invention, the turbojet being schematically represented by its variable-geometry exit nozzle.

A further example of nozzle geometry detection is shown in FIGURE 2, in which an oil distributing slide-valve 23 in the main regulator 7 has its control rod 23a actuated by any convenient means of the main regulator 7 (see FIGURE 1) and which operates the nozzle rams 6. The nozzle geometry detector is hydraulic or pneumatic and comprises a cylinder 24 through which slides a piston 25 urged toward the left by a spring 26 and defining chambers 24a and 24b in the cylinder. A pipe 27 leading to the left-hand chamber 24a is fed with a control fluid under constant pressure, at 27a, through a restriction 28. The right-hand chamber 24b is vented by a pipe 29 leading to the open atmosphere or to a non-pressurized-fluid return means. Piston 25 has formed therein an opening 25a before which is movable a valve member 30a carried on a rod 30 slidable in response to a lever 31 which is fulcrumed at 31a and whose end remote from rod 30 is displaced simultaneously with the jet-pipe nozzle by the rams 6.

It will be understood that the movement of valve member 30a in the cylinder 24 is related to the degree of opening of nozzle flaps 5, and valve member 30a controls a leakage of fluid out of chamber 24a through the opening 25a of piston 25 to chamber 24b and pipe 29. The pressure of fluid in chamber 24a urges piston 25 against spring 26, and obviously the pressure is dependent on the degree of opening of nozzle flaps 5 and the tension of spring 25.

A slide-valve 17a is adapted to shut and uncover the leakage 18 out on the chamber 13 of capsules 15, by the movement of a slide member 22a which is urged by a spring 32 to the closure position of leakage 18 against the pressure in a right-hand chamber of the slide-valve, which communicates through a pipe 27b and pipe 27 with the chamber 24a of cylinder 24.

The springs 25 and 32 are so chosen that the leakage 18 is closed by spring 32 until the pressure in chamber 24a is so increased by the nozzle flaps 5 approaching the maximum opening position of the nozzle, that the said pressure moves slide-member 22a to the left against spring 32 to uncover the passage from chamber 13 to leakage 18.

Figure 3:
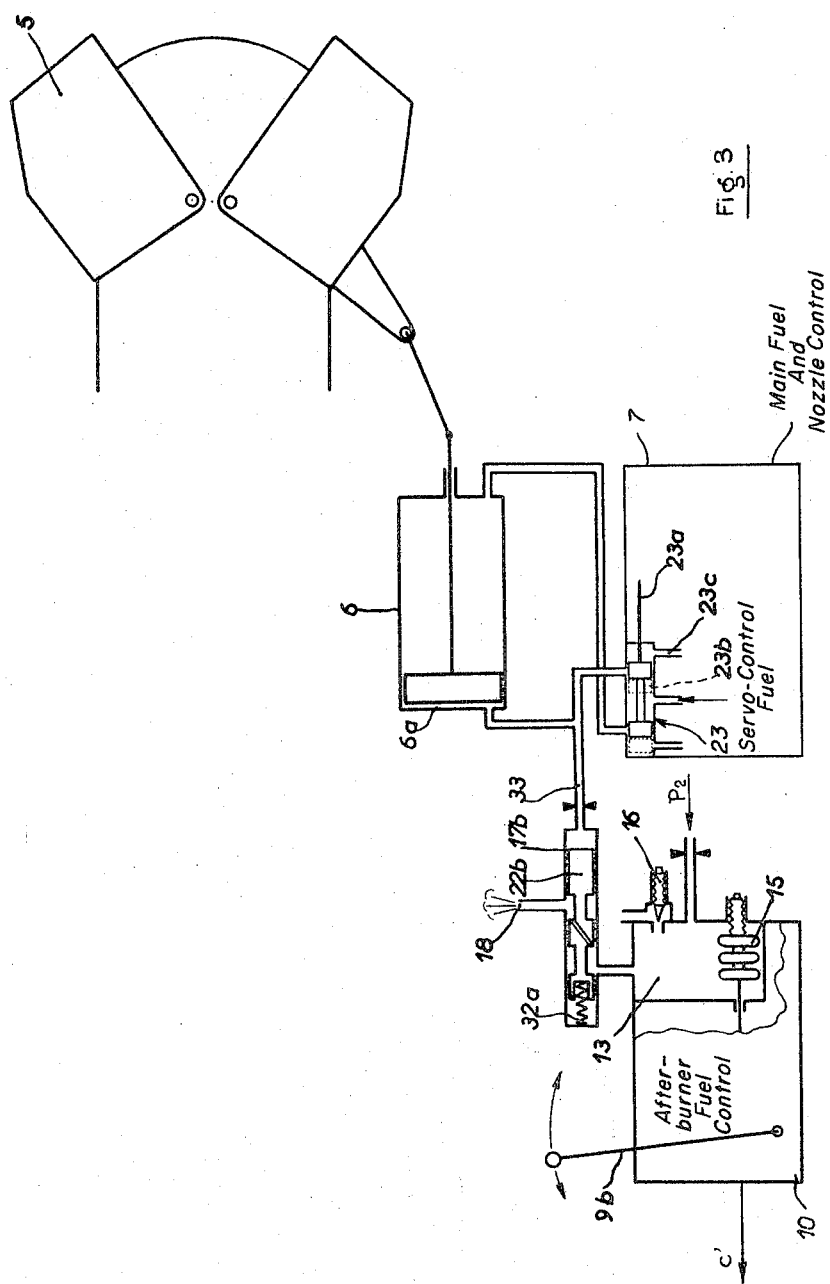

Reference is next had to FIGURE 3 for an example of detection based on the pressure drop occurring in the chamber 6a of a nozzle ram when the nozzle 5 is fully open and the main regulator requires a further increase in the outlet section thereof. Said regulator then places the slide of slide-valve 23 in the position 23b shown in dotted lines, thereby venting the chamber 6a to the slide-valve return passage 23c and causing a pressure drop in chamber 6a. The pressure in this chamber is applied through the pipe 33 to the right-hand side of the slide 22b of valve 17b, which valve is similar to the valve 17a of FIGURE 2 but functions in the opposite sense, that is to say that the slide 22b closes the valve 17b when it is moved toward the left against the spring 32a by the pressure which is normally applied to the right-hand side of the slide. As already stated, this pressure drops and the spring 32a moves the slide 22b toward the right and thus creates the leakage 18.

Figure 4:
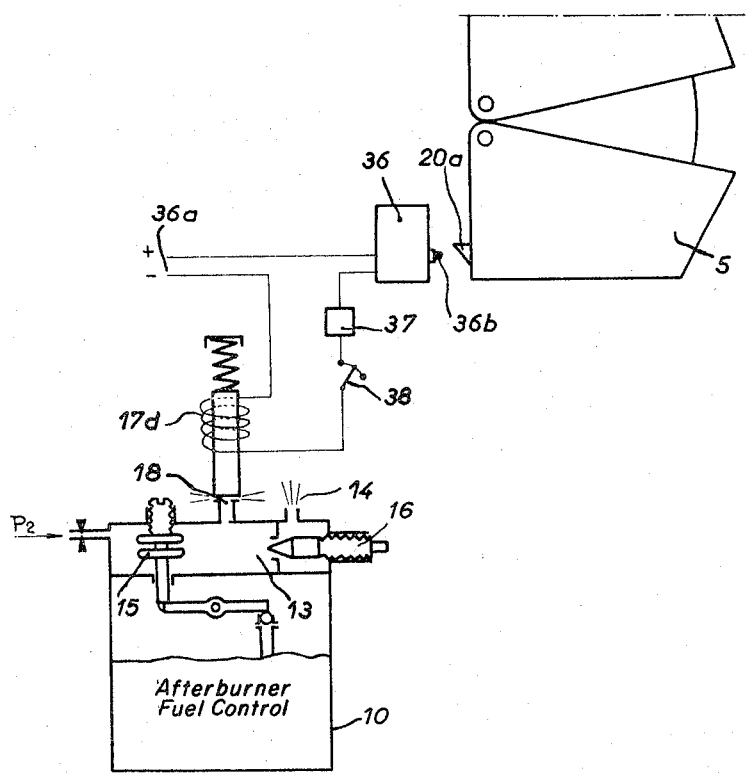
FIGURE 4 is a view corresponding to FIGURES 2 and 3, showing still another form of embodiment.

In the alternative constructional form of FIGURE 4, the configuration of nozzle 5 is detected by a contactor 36 which is supplied with current from the terminals 36a and controls the leakage 18 from the chamber 13 electrically, by means of an electro-valve 17d. A timing relay 38 and a manual switch 38 are provided in the circuit. As in FIGURE 1, the capsules 15 control the metering device (not shown).

For exemplary purposes only, the embodiment of FIGURE 4 is shown as comprising a catch 20a on one nozzle flap that is adapted to operate a pushbutton 36b when the nozzle 5 is fully open, whereby the contactor 36 can be closed and the valve 17d creating the leakage 18 opened.

Figure 5:
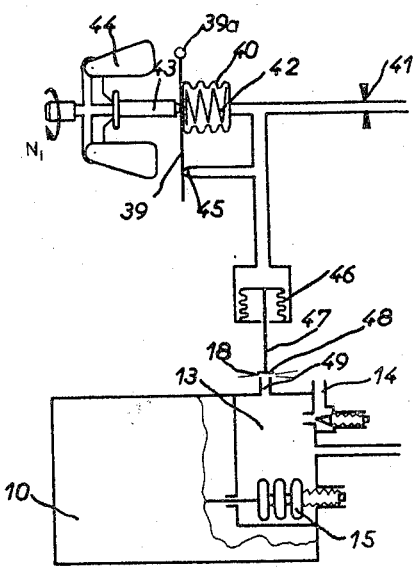
FIGURE 5 shows diagrammatically a limiter according to the invention as applied to a twin-spool turbojet.

Reference is now had to FIGURE 5, which relates to an afterburner load limiter applicable to multi-spool gas turbines of the by-pass type or not. This form of embodiment is more specifically applicable to a turbojet of the type referred to precedingly, wherein the main regulator (not shown) controls the nozzle outlet section whereby to maintain the turbine upflow temperature constant by operating on the rotation speed of the HP spool. The effect of the load limiter is to reduce the after burner fuel flow $C'$ when the speed $N_1$ of the LP rotor drops below a certain figure for which the exit nozzle has reached its limit stop at maximum outlet section.

A vane 39 pivotally mounted about a shaft 39a supports a capsule 40 which receives a constant feed pressure applied upstream of a restriction 41. A spring 42 urges said vane into pressure contact against a slidable shaft 43 upon which a flyweight-governor 44 keyed to the LP rotor shaft acts to counter the spring 42. The vane 39 oscillates about its shaft 39a responsively to the counter effects of, on one hand, the spring 42 and the pressure prevailing in capsule 40, and, on the other hand, of the regulator 44. The vane oscillates before the outlet orifice of a jet 45 communicating with the capsule 40. The movements of vane 39 vary the leak rate through the jet 45 and consequently modulate the pressure in the capsule 40 downstream of restriction 41. This pressure is applied to the exterior of a capsule 46 whose interior is maintained at atmospheric pressure and which is rigidly connected to a rod 47 bearing a valve 48.

Valve 48 normally obturates a calibrated hole 49 in the chamber 13 of afterburner regulator 10, which is similar to that of FIGURE 1.

For decreasing values of $N_1$ the vane 39 is thrust to the left, increasing the leakage at 45 and causing a pressure drop about the capsule 46, which capsule then expands and raises the valve 48 through the agency of rod 47, thereby producing a supplementary leakage 18 in the chamber 13. This produces a reduction $\beta'P_2$, which in turn reduces C′ and consequently also the counterpressure downflow of the LP turbine and, most notably, downflow of the fan in the case of a turbofan.

Figure 6:
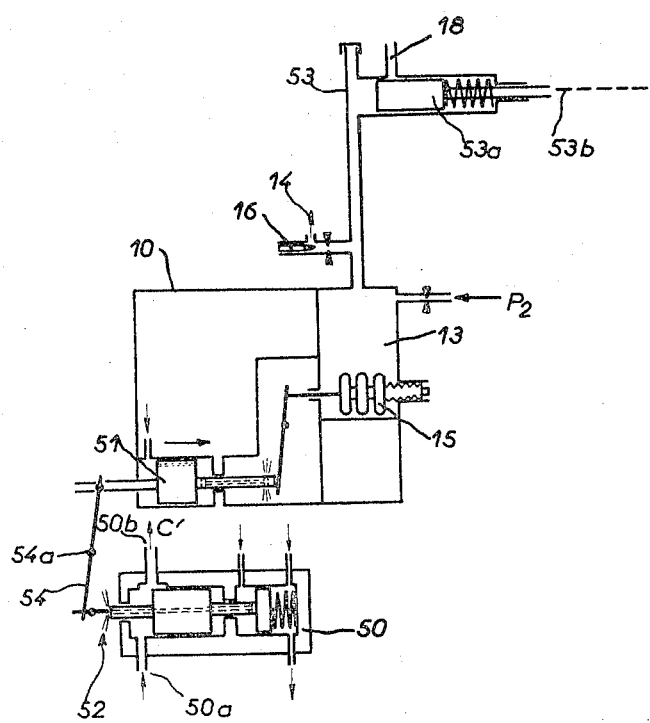
FIGURE 6 is a diagrammatic partial section of a limiter according to the invention, showing certain constructional details.

It is to be noted that in all the forms of embodiment described hereinbefore the reduction in the flow C′ is obtained by generating a suplementary leakage 18 in the chamber 13 containing the control capsules of an afterburner regulator. Reference is lastly had to FIGURE 6 for a form of embodiment of the supplementary leakage 18 in an afterburner regulator 10, wherein the capsules 15 operate in known fashion on the afterburner fuel metering device 50 through a variable-leakage ball-type feeler device 52 and through the medium of a servo-control 51.

The leakage 18 is determined by a valve 53 whose obturator, schematically designated at 53a, is operated by a detection device 53b which may be any one of those hereinbefore described with reference to FIGURES 1 through 4. When this obturator opens the valve in response to said detection device, a leakage 18 occurs which lowers the pressure $\beta'P_2$ in the chamber 13 of afterburner regulator 10. This produces an expansion of the capsules 15 which, in the manner well known per se, in turn move the piston of servo-control 51 toward the right. This in turn causes the slide of metering device 50 to move toward the left and to reduce the fuel flow C′ entering through 50a and issuing from 50b into the line leading to the afterburner injectors.

The manner of operation of the servo-control 51 and the metering device 50 are well known to the specialist in the art, so that both these units are represented schematically only by their essential component parts. The control means of the afterburner regulator operating through the pilot's lever (shown at 9b in FIGURE 1) functions in known manner by shifting the fixed point 54a of lever 54 and thereby modifying that position of metering device 50 which corresponds to a given position of servo-control 51.

It is, of course, to be understood that the forms of embodiment described hereinabove are given by way of example only and that many changes and substitutions of parts may be made without departing from the scope of the invention as defined in the appending claims. Manifestly, the load limiter may operate on the flow rate C′ through any means adapted to the type of afterburner regulator utilized.

What is claimed is:

1. In a turbojet having: an afterburner, a variable-area nozzle provided with movable elements for varying the area thereof between a maximum opening position and a minimum opening position, a nozzle control system for adjusting the position of said movable elements, and an afterburner fuel supply system which includes an afterburner control comprising an afterburner fuel flow meter, a source of fluid at a pressure responsive to an operative parameter of the turbojet, an enclosure, a connection between said source and said enclosure, a restriction in said connection, a constant restricted leak passage communicating with said enclosure, and operating means extending between said enclosure and said meter for actuating said meter by said pressure fluid, the arrangement being such that the fuel flow varies with the fluid pressure in said enclosure; a correcting device for limiting said afterburner fuel flow when said nozzle is in said maximum opening position, comprising a further restricted leak passage communicating with said enclosure, obturating means for closing said further restricted leak passage, control means for actuating said obturating means so as to open said further restricted leak passage, and means under the control of said movable elements of said nozzle for actuating said control means by said movable elements in a position near to said maximum opening position.

2. A correcting device as claimed in claim 1, wherein the obturating means comprise a fluid pressure responsive valve, the control means comprise means for supplying pressure fluid to said valve and means for varying the pressure of said fluid, and the means under the control of the movable nozzle elements are operatively connected to said fluid pressure varying means for actuating the same.

3. A correcting device as claimed in claim 1 applicable to a turbojet in which the nozzle control system comprises a double-acting jack provided with two operative chambers, and a distributor adapted to supply pressure fluid to one of said chambers for setting the movable nozzle elements to maximum opening position and to the other of said chambers for setting said movable nozzle elements to minimum opening position, wherein the obturating means comprise a pressure fluid responsive valve adapted, when pressurized, to close the leak passage, and, when non-pressurized, to open said leak passage, the control means comprise a pipe connecting said valve to said second-mentioned chamber of the jack, and the means under the control of said movable nozzle elements comprise said jack.

4. A correcting device as claimed in claim 1, wherein the obturating means comprise an electrovalve, and the control means comprise energizing means for the electrovalve, including switch means which are operatively connected to the means under the control of the movable elements of the nozzle.

References Cited by the Examiner
UNITED STATES PATENTS

| | | | |
|---|---|---|---|
| 2,789,417 | 5/1957 | Kuzmitz | 60—35.6 |
| 2,918,790 | 12/1959 | Schoch | 60—35.6 |
| 3,007,303 | 11/1961 | Williams | 60—35.6 |
| 3,082,599 | 3/1963 | White et al. | 60—35.6 |

JULIUS E. WEST, *Primary Examiner.*